F. A. Finn.
Threshing-Mach.
Nº 74330    Patented Feb. 11, 1868.

Witnesses
Theo Tusche
Wm Speurn

Inventor
F. A. Finn
Per Munn & Co
Attorneys

United States Patent Office.

FELIX A. FINN, OF SALT POINT, NEW YORK.

Letters Patent No. 74,330, dated February 11, 1868; antedated February 6, 1868.

IMPROVEMENT IN THRESHING-MACHINES.

*The Schedule referred to in these Letters Patent and making part of the same.*

TO ALL WHOM IT MAY CONCERN:

Be it known that I, FELIX A. FINN, of Salt Point, Dutchess county, New York, have invented a new and improved Grain-Threshing Machine; and I do hereby declare that the following is a full, clear, and exact description thereof, which will enable others skilled in the art to make and use the same, reference being had to the accompanying drawings, forming part of this specification.

The object of this invention is to obtain a machine by which grain may be threshed by power, and without bruising or breaking the straw.

The invention consists in the employment or use of one or more rotating cylinders, provided with jointed bars or flails, and placed within a box, having an inclined floor or bottom, whereby the straw may be fed along underneath the beaters or flails, by the action of the latter, and the grain thereby threshed out of the heads. The invention also consists in a novel manner of operating or giving the necessary shake-motion to a screen which separates the grain from the straw, as hereinafter fully shown and described. In the accompanying sheet of drawings—

Figure 1:
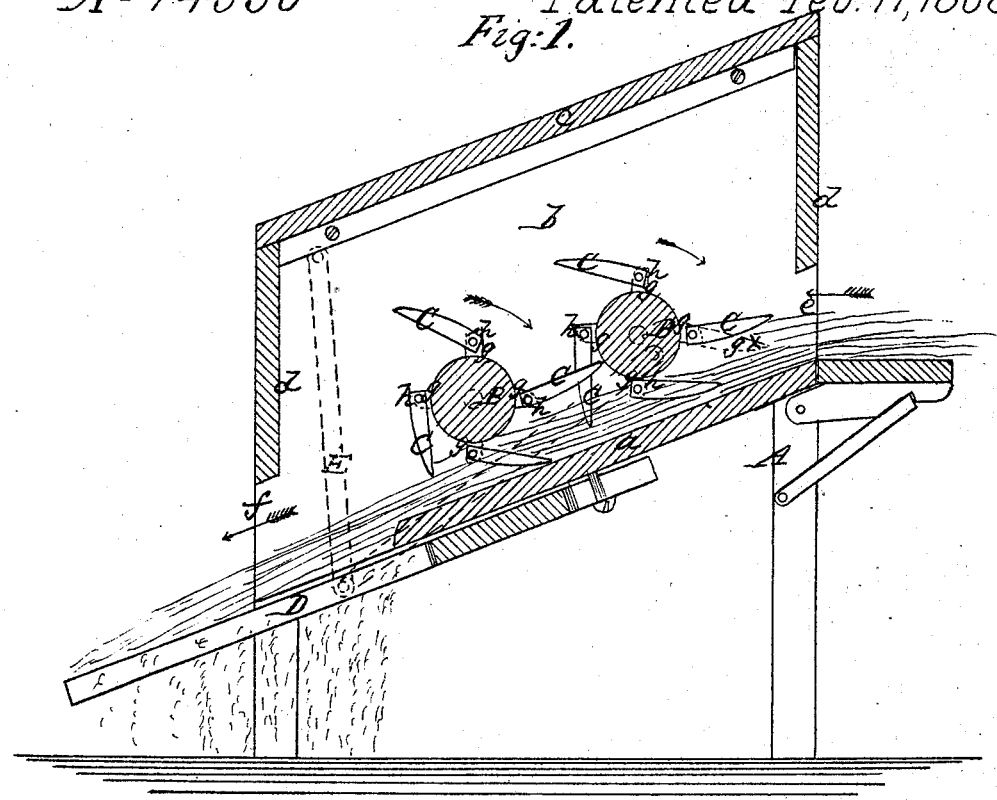
Figure 2:
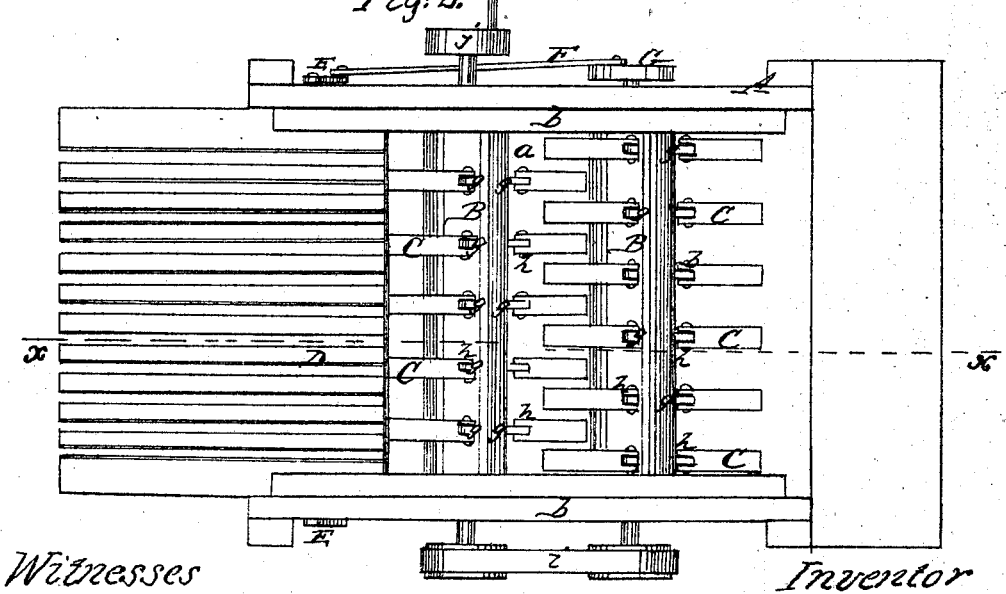

Figure 1 is a side sectional view of my invention, taken in the line $x\, x$, fig. 2.

Figure 2, a plan or top view of my invention.

Similar letters of reference indicate corresponding parts.

A represents a framing, constructed in any proper manner, and having an inclined platform, $a$, within it, which serves as the bottom of a box, in which the threshing-cylinders B B are placed, the journals of said cylinders having their bearings in the sides $b\, b$ of the box, which sides are permanently secured to the framing A. The top $c$ and ends $d\, d$ of this box are connected together, made separately from the framing, and connected thereto in any proper manner, the ends $d\, d$ being sufficiently short to admit of an opening, $e$, at the upper or feed-end of the box, to allow the grain being fed to the threshing-cylinders, and also admit of an opening, $f$, at the lower end of the box for the discharge of the straw, (see fig. 1.) The threshing-cylinders B B are placed horizontally, and are each provided with radial projections $g$, which are fitted in the cylinders in circumferential rows. To the outer end of each projection $g$ there is connected by a joint, $h$, a beater or flail, C. These joints are so formed that the flails are not allowed to extend down much below a radial line with the projections $g$, the fullest descent being shown in red in fig. 1, at $g^\times$, but they are allowed to move upward or in a reverse direction indefinitely, no check to their movement in that direction being required. The flails C, of one cylinder B, are in line with the spaces between the flails of the other cylinder, as shown clearly in fig. 2, and the face sides of the flails are curved or rounded in such a manner that they will, as the cylinders B B are rotated, strike the grain with the best possible effect, and with a surface of considerable area, or with as great a portion of their length as practicable, as will be fully understood by referring to fig. 1.

The two cylinders B B are connected at one end by a belt, $i$, or by gearing, and the cylinders are rotated by a belt which passes over a pulley, $j$, at one end of one of the cylinders B. The cylinders rotate in the direction indicated by the arrows 1. The flails are thrown down upon the grain by the centrifugal force generated by the rotation of the cylinders, and have a combined beating and drawing action, the former threshing the grain from the heads of the straw, and the latter action feeding the straw down the inclined bottom $a$. The feed or passage of the straw down the inclined bottom $a$ may be regulated, as desired, by raising or lowering the framing A at the lower or depressed end of the bottom $a$, and the legs of the framing at this end may be made so as to be capable of being lengthened or shortened for this purpose.

D represents a screen, placed underneath the lower part of the bottom $a$, and suspended at each side by a hanger, E, from the sides $b$ of the threshing-box, said hangers admitting of the screen having a longitudinal shake-movement, and this movement is given it by a rod, F, connected to a crank-pulley, G, on one end of one of the cylinders B, as shown in fig. 2. The threshed grain passes through the screen D, the straw being discharged from its end.

By this invention grain may be threshed without injuring the straw in the least, and the work may be performed rapidly and with but a moderate power.

Having thus described my invention, what I claim as new, and desire to secure by Letters Patent, is—

1. The inclined bottom a, in combination with one or more cylinders, B, provided with jointed flails, all arranged substantially as and for the purpose specified.

2. The screen D, operated by the crank-pulley G and connecting-rod F, from one of the threshing-cylinders, substantially as and for the purpose set forth.

The above specification of my invention signed by me, this 27th day of June, 1867.

FELIX A. FINN.

Witnesses:
    WM. F. McNAMARA,
    ALEX. F. ROBERTS.